Figure 1:
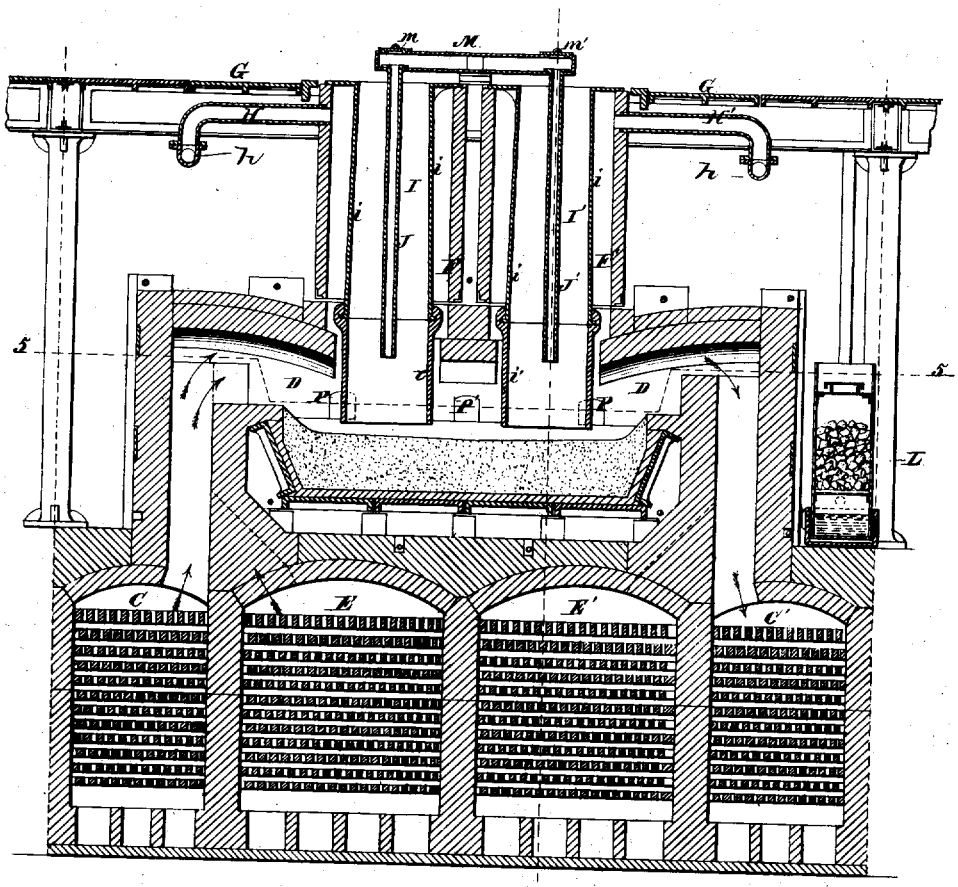

7 Sheets—Sheet 1.

C. W. SIEMENS.

METALLURGICAL PROCESSES AND FURNACES.

No. 7,862. Reissued Aug. 28, 1877.

*Witnesses.*

Joseph C. Wildman

W. T. Hutchinson

*Inventor:*

Charles William Siemens by Charles S. Whitman

Attorney

7 Sheets—Sheet 2.

C. W. SIEMENS.

METALLURGICAL PROCESSES AND FURNACES.

No. 7,862. Reissued Aug. 28, 1877.

Witnesses.

Joseph C. Wildman

W. J. Hutchinson

Inventor.

Charles William Siemens by Charles S. Whitman

Attorney

7 Sheets—Sheet 3.

C. W. SIEMENS.

METALLURGICAL PROCESSES AND FURNACES.

No. 7,862. Reissued Aug. 28, 1877.

Witnesses.
Joseph C. Wildman
W. F. Hutchinson

Inventor:
Charles William Siemens
by Charles S. Whitman
attorney

7 Sheets—Sheet 4.

C. W. SIEMENS.

METALLURGICAL PROCESSES AND FURNACES.

No. 7,862. Reissued Aug. 28, 1877.

Witnesses
Joseph C. Wildman
W. T. Hutchinson

Inventor
Charles William Siemens
by Charles S. Whitman
Attorney

C. W. SIEMENS.
METALLURGICAL PROCESSES AND FURNACES.
No. 7,862. Reissued Aug. 28, 1877.
*Fig. 6.*
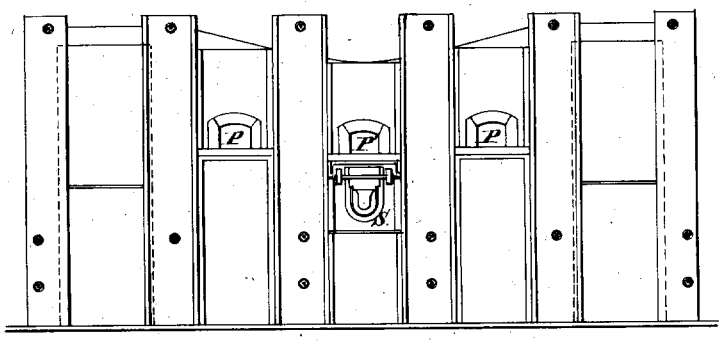
*Fig. 7.*
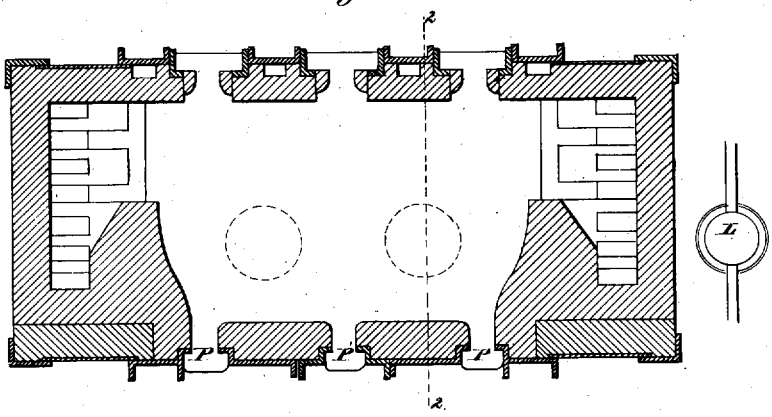
*Fig. 8.* *Fig. 9.* *Fig. 10.*
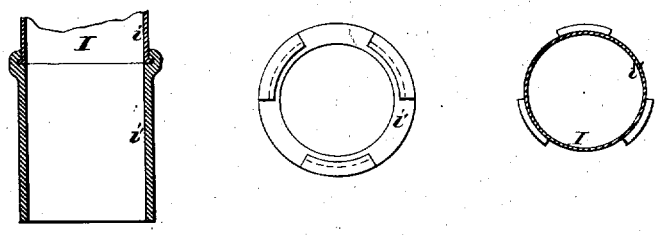
Witnesses,
Joseph G. Wildman
W. T. Hutchinson
Inventor,
Charles William Siemens
by Charles S. Whitman
attorney

C. W. SIEMENS.

METALLURGICAL PROCESSES AND FURNACES.

No. 7,862. Reissued Aug. 28, 1877.

*Witnesses.*

Joseph Ettwildman

N. T. Hitchinson

*Inventor.*

Charles William Siemens by Charles S. Whitman attorney

C. W. SIEMENS.
METALLURGICAL PROCESSES AND FURNACES.
No. 7,862. Reissued Aug. 28, 1877.
*Fig. 14.*
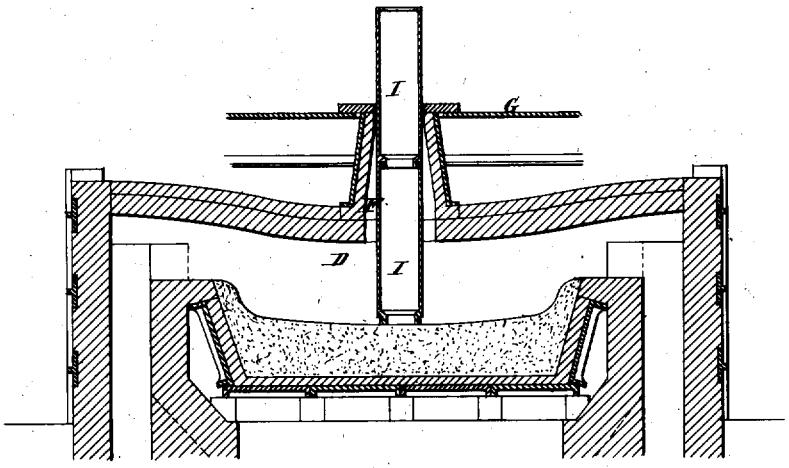
*Fig. 15.*
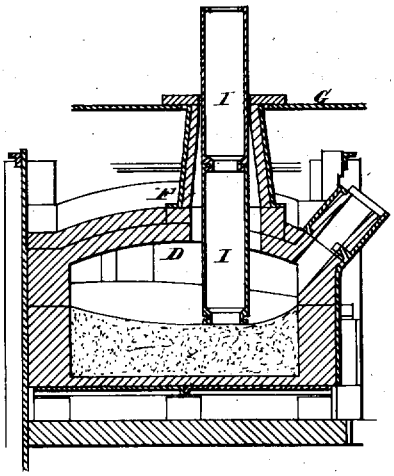
*Fig. 16.*
*Fig. 17.*
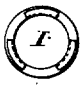
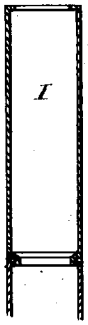
*Fig. 18.*
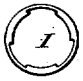
*Witnesses.*
Joseph C. Wildman
W. T. Hutchinson
*Inventor.*
Charles William Siemens
by Charles S. Whitman
Attorney

UNITED STATES PATENT OFFICE.

C. WILLIAM SIEMENS, OF WESTMINSTER, ENGLAND.

IMPROVEMENT IN METALLURGICAL PROCESSES AND FURNACES.

Specification forming part of Letters Patent No. 89,441, dated April 27, 1869; Reissue No. 7,862, dated August 28, 1877; application filed December 5, 1876.

DIVISION A.

*To all whom it may concern:*

Be it known that I, CHARLES WILLIAM SIEMENS, of Westminster, in the county of Middlesex, England, have made a new and useful invention having reference to Furnaces and Metallurgical Operations, of which the following is a specification:

My improvements have reference to furnaces in which gaseous fuel and heat-regenerators are used for the production of cast-steel, and to the manufacture by certain processes, hereinafter described, of cast-steel on the bed of regenerator-furnace.

Cast-steel may be produced directly from the ore by the process described in the specification of certain Letters Patent granted to me, and bearing date September 20, 1866, and numbered 2,413 of British patents; or it may be produced by melting cast-iron (containing, by preference, manganese) and scrap-iron or scrap-steel, or blooms of puddled steel or iron, in a reverberatory furnace; or it may be produced by these two processes conjointly.

In the specification to the before-mentioned Letters Patent two furnaces were shown, in one of which the ore, with its admixtures of fluxes and reducing agents, descended at the two sides of the heated chamber, and in the other of which the ore descended through a single shaft or hopper upon the bed of the reverberatory furnaces.

According to my present improved furnace these shafts or hoppers are placed vertically, or nearly so, and are made of considerable altitude, descending at the same time to the surface of the metallic bath in the furnace, or nearly so, in order to cause a more gradual and uniform descent of the ore into the furnace with as little exposure as possible of the spongy metal reduced in the hoppers to the oxidizing influence of the flame; and the reduction of the ore within these shafts or hoppers is further assisted by the application of flues or heated chambers around them, through which the heat of the furnace is made to circulate.

Into each vertical ore-shaft a pipe carrying a supply of hydrocarbon, or other reducing-gases, may be made to enter from above, with its outlet near the base of the vertical column.

If the ore employed is in the state of powder, and therefore not pervious to the reducing-gas, I mix the same with loose and pervious reducing agents, such as wood in small pieces, sawdust, dried peat, and charcoal, separately or in conjunction with pitch, asphalt, or oils, as mentioned chiefly in the specification to the hereinbefore-mentioned Letters Patent, in which case the introduction of gas may be dispensed with.

In commencing operations I generally form a metallic bath of cast-iron, introduced through side doors of the furnace, which greatly facilitates the liquefaction of the metallic spongy iron formed in the hoppers.

With the ore, scrap-iron, or steel—such as engineers' turnings, &c.—or cast-iron, in a more or less divided state, may be charged into the hoppers, to be also absorbed in the metallic bath; or wrought metal may be fed in through separate side doors or hoppers.

If only wrought-iron and cast metal are to be employed, then, in place of the vertical hoppers or shafts, inclined hoppers may be conveniently adopted, through which the pieces of wrought-iron, such as bars or old rails, descend by gravity, dipping, with their most heated ends, into the metallic bath, where they are dissolved, a certain portion of the flame being allowed to escape out of the top of the hopper, in order to warm the iron during its descent, and without lowering the temperature of the furnace; or pigs of cast-metal (by preference white metal) may be fed down these hoppers, and an oxidizing-flame be resorted to for effecting the necessary decarburization, the oxygen supplied by the regenerative gas-furnace to be employed being at a very elevated temperature, and therefore well adapted for effecting such decarburization, which, however, may be aided by stirring, and by the addition of comparatively pure metallic oxides on the surface of the bath.

At the end of each operation, whatever may be the ingredients employed, before tapping the metal I generally add a certain proportion of rich spiegeleisen, or of metallic manganese, to the bath, in order to improve the quality of the steel.

The ore to be employed for the first-named process should, by preference, be a pure oxide of iron, containing as little gangue, or sulphur, or phosphorus as possible. Magnetic-iron stone, hematite ore, and rich calcined spathic ore are particularly applicable; or such a mixture may be conveniently adopted as contains both silica and fluxing materials, such as lime or magnesia in suitable proportion, avoiding the necessity of adding separate fluxing materials.

Having thus premised, I will now proceed more particularly to describe my invention.

Figures marked 1, 2, 3, 4, 5, 6, 7, 8, 9, 10, 11, 12, 13, 14, 15, 16, 17, and 18 of the accompanying drawings show the before-described two principal types of furnace for the production of cast-steel in large masses, one of which is arranged more particularly for the employment of oxides, or other iron ores, and the other for the conjoint employment of bars or rails of wrought-iron or steel and of pig metal, or for the employment of pig metal only.

Figure 2:
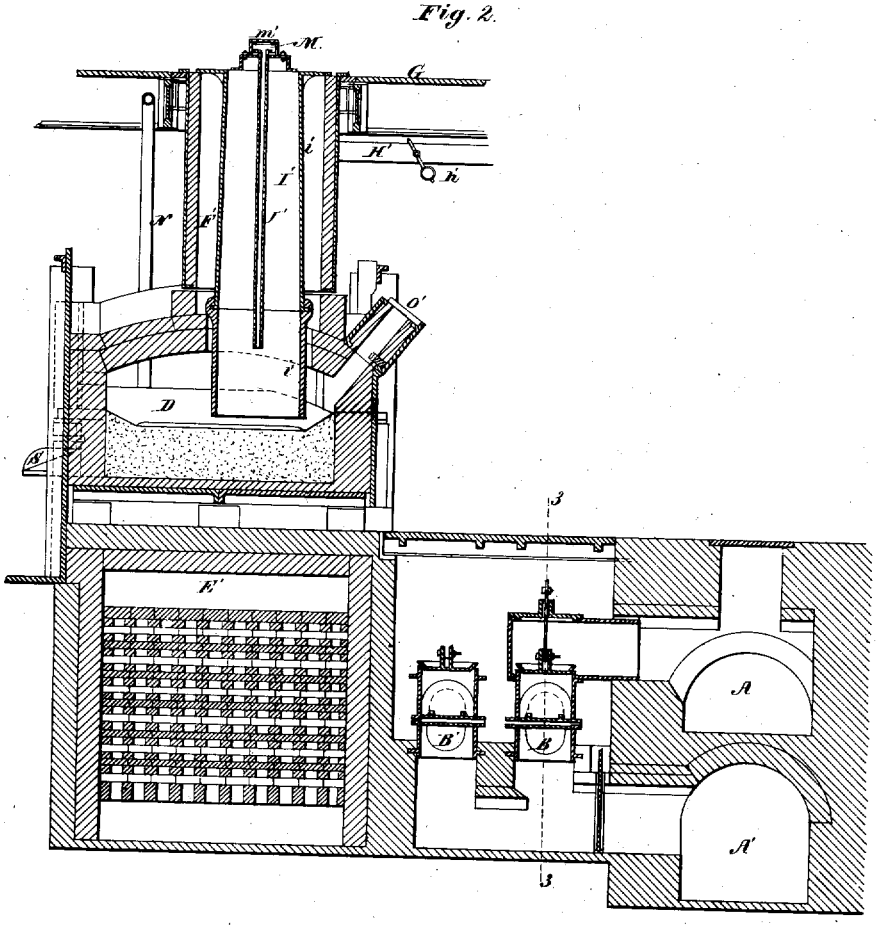
Figure 3:
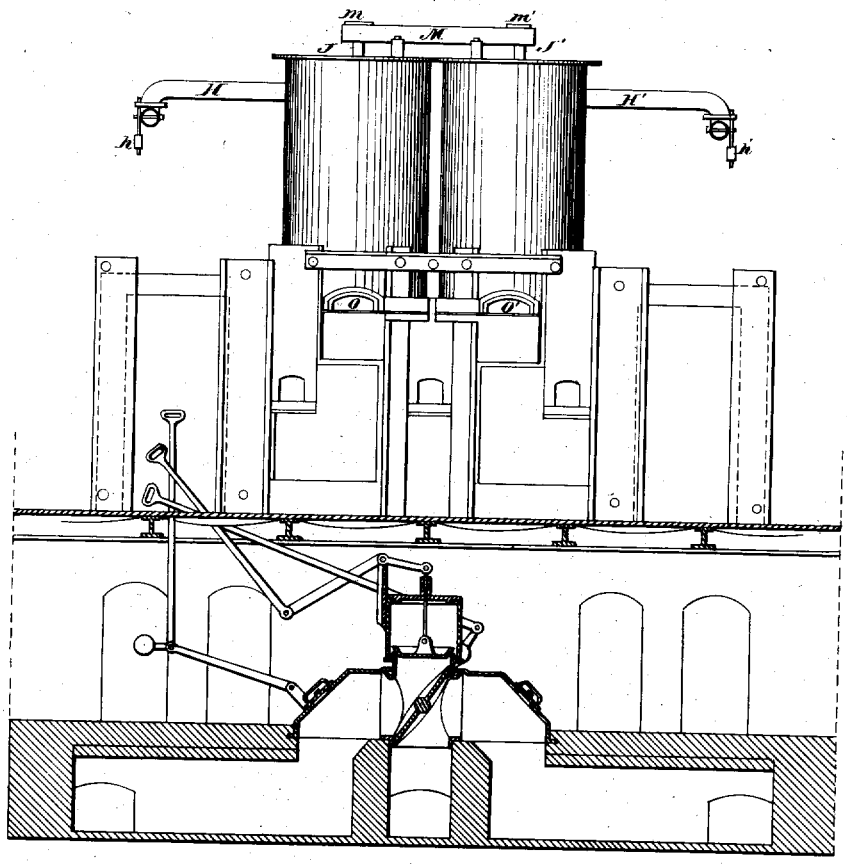
Figure 4:
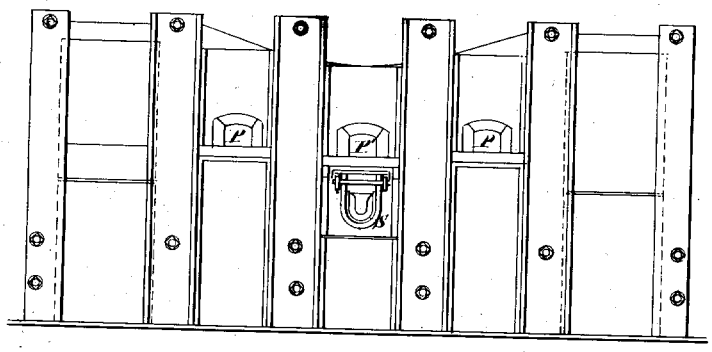

Figs. 1, 2, 3, 6, 7, 8, 9, and 10, show my improved furnace for producing steel directly from the ore. Fig. 1 is a longitudinal section through the furnace and regenerators. Fig. 2 denotes a transverse section in line. Fig. 3 shows an elevation of the furnace, and also a section through the gas-passages on line 3 3 of Fig. 2. Fig. 6 represents an elevation of the tapping-hole side of the furnace. Fig. 7 shows a sectional plan on line 5 5 of Fig. 1, and Figs. 8, 9, and 10, show enlarged details or parts to be hereinafter explained.

Similar letters of reference indicate similar parts in each of the figures.

One or more gas-producers, such as described in specifications of former Letters Patent granted to me, are to be used with my present furnace, and, when used, may be placed at a considerable distance from the furnace. The gas is conveyed from the producers through the flue A, (see Fig. 2,) and directed, through the passages of a reversing-valve, B, alternately into the regenerators C C′, whence, after becoming heated, it passes into the furnace alternately at the right-hand and left-hand side of the heated chamber D thereof, at which points the gas meets the atmospheric air proceeding alternately from the regenerators E E′, and enters into combustion with the same.

The atmospheric air is directed into one or other of the regenerators E E¹ by the reversing-valve B′. A′ is the flue through which the products of combustion escape to the chimney. The roof and sides of said chamber or furnace D are to be constructed of the most refractory materials, such as the best silica or dynas brick, while the bottom or bed may be formed of a mixture of two descriptions of sand, the one being nearly pure silica, and practically infusible, and the other a fine red loam, which, in being acted upon by the heat of the furnace near the surface, fuses, and thus binds the white sand together, so as to form a hard and impervious crust for the reception of a bath of molten steel. A mixture of two or three parts of white sand with one of red is found to answer well, but it is important that the two sands should be well mixed, and charged dry into the furnace, or a natural sand may be substituted, if a suitable quality is to be obtained.

The surface of the sand is so formed as to constite the hollow bath shown in the drawings; and, in order to give a certain thickness and solidity to the crust, I charge the last portions of the sand in thin layers when the furnace is already at a full welding-heat.

In the roof of the furnace are formed two circular orifices, through which the interior of the furnace communicates with two vertical cylindrical chambers, F F′, (see Figs. 1 and 2,) which are constructed of shells or tubes of wrought-iron, lined with brick-work, and are suspended from the upper flooring or stage G, in order not to press upon the heated arch of the furnace. The joints between the arch and these chambers should be made good with clay.

The upper ends of the chambers F F′ are made to communicate with a chimney by means of pipes H H′, provided with regulating-dampers. Through the open upper ends of these chambers two vertical hoppers, pipes, or retorts, I I′, pass down nearly to the surface of the bed of the furnace D, as shown, they being suspended from the tops of the chambers F F′. The upper portions *i* of the pipes I I′ are to be constructed of cast-iron, and may continue to slightly increase in diameter as they descend. The lower portions *i′* of such pipes I I′ are to be made of clay, such as is usually employed for making steel-melting pots. The clay cylinders *i′* may be attached to the iron pipes *i* by means of bayonet-joints, as shown at the enlarged details in Figs. 8, 9, and 10, of which Fig. 8 shows a section, Fig. 9 a plan of the clay cylinder, and Fig. 10 exhibits a section and plan of the iron cylinder.

These hoppers or retorts I I′ receive the ore with which the furnace is to be charged. The requisite reducing-gases are to be conveyed into the mass of ore contained therein through small pipes J J′ descending through the hoppers.

The reducing-gases may be derived from the gas-producer or producers before alluded to, in which case they are to be forced, by a steam-jet, into the lower part of a scrubber, L, (see Fig. 1,) which is to be filled with coke, or other suitable loose material, over which water is to be made to trickle in copious streams, such water escaping through an overflow, the object being to wash and purify the gas, so as to remove therefrom the vapors and sulphurous acid, &c.

The gas may be also passed over quicklime, to complete the purification, and through a heating apparatus, if thought desirable, before reaching a cast-iron cross-pipe, M, through the ascending pipe communicating therewith. From thence the gas descends through the pipes J J′, as before described. These pipes are carried by the cross-pipe M, being dropped through openings (in the top of the latter) provided with covers *m m′*. The pipes provided with flanges at their upper ends rest upon the inner bottom surface of the pipe M.

By this arrangement or application of the pipes J J′ to the pipe M, either of the pipes J J′ may be readily removed from the pipe M and exchanged for a fresh one, in case of being injured by the heat of the lower parts of the hoppers. The cross-pipe M can also be readily removed, and the hoppers themselves be raised, when injury may occur to their lower parts of pot clay, which are exposed to the heat of the furnace.

The bayonet-joints between the clay and iron portions of the hoppers admit of the latter being readily separated from the furnace and exchanged for others in case of injury, one or more of them being generally kept in readiness in an annealing-stove.

The mode of working this furnace may be thus described: In heating the furnace, the open upper ends of the cylindrical chambers F F′ are to be closed by covers, which are to be replaced by the hoppers I I′, when a full white heat has been obtained. As soon as the hoppers are in place a small charge of charcoal is to be introduced into each, which should be followed by the ore, or compound of ore and reducing agent, and flux to be employed, until they are entirely filled. The gas-supply pipes J J′ having likewise been placed in position, a supply of reducing-gas is to be next turned on, which can be regulated according to circumstances by means of the steam-jet usually employed in forcing it on. The dampers *h h′* of the flues H H′ are to be also opened, in order to cause a portion of the flame from the furnace to pass up in the annular spaces surrounding the hoppers I I′ in the chambers F F′, in order to heat the hoppers to redness. At the same time, also, pig metal is to be introduced into the furnace through the side openings O O′. This metal, on melting, will form a bath of molten metal below the hoppers and on the bed of the furnace.

By the conjoint action of the reducing agents and of the heat applied externally to the spongy iron reduced from the ore, which, coming into contact with the metallic bath, will be readily absorbed and dissolved therein, the earthy constituents rise to the surface of the bath in the form of slag or scoriæ. In proportion as the spongy iron produced by reduction in the hoppers is dissolved, fresh material should be added to the top of them, and it will gradually descend in the hoppers, and, in its turn, will be reduced and dissolved.

The heat of the furnace being maintained at a steel-meltng heat, it is necessary to observe, from time to time, whether the metallic bath remains fluid. Should it commence to thicken, additional cast-iron is to be introduced (at the side openings O) upon the sloping banks, whence the molten cast metal descends into the bath, and supplies fresh carbon to the same.

The scoriæ which may form upon the surface of the metallic bath should be removed, from time to time, through the opening P′, which may be at a lower level than the side or charging doors P, as indicated in the arrangement of this furnace at Figs. 4, 6, 11, and 12. When sufficient molten metal has accumulated upon the bath, disks of cast-iron, lined upon the under sides with clay, are to be introduced upon the surface of the ore in the hoppers.

These disks may be made in two parts, for the convenience of introducing them without removing the gas-supply pipes J J′, and the two halves may be united by a strong wire fastened through lugs and forming a loop.

When these disks may have descended (by the weight of the ore filled in upon them) until they have passed the joint between the cast-iron and clay hoppers, wires connected to the disks may be caused to catch upon the gas-pipe M and prevent their farther descent.

The material below the disks having become absorbed in the bath, the latter should be stirred and tested. The slag should be of light brown or a light green color, and contain little iron in combination.

Should it be heavy and dark in color, and the metal bath below it be thick and partially set in masses of malleable metal, more cast-iron should be charged in at the side doors or the hoppers O, and it will also be advisable to throw some charcoal upon the fluid bath.

The heat of the furnace must also be raised to and maintained at a full steel-melting heat, and the bath be stirred as soon as the pig metal may be melted.

Should the slag remain dark, it is a proof that sufficient flux has not been charged with the ore to combine with the silica generally contained in it. Quicklime should be added, which will readily combine with the slag, and will liberate the iron and allow the same to pass into the metallic bath below.

To assist in the reduction of the iron contained in the slag, I often throw in, after adding the quicklime, about ten pounds of charcoal, and stir it well into the slag, so regulating the flame, at the same time, that there is a slight excess of gas in the furnace, in order not to burn the charcoal away too rapidly.

Should much slag remain, it should, by means of a rake, be removed through the center-door P′, the sill-plate of which is to be arranged nearly on a level with the metallic bath when full; or the slag may be allowed to run off continuously through a hole or door, the height of which may be gradually raised by the addition of clay or sand, or otherwise, as the metal accumulates in the bath. A sample of the metallic bath may next be taken out by means of a small ladle, washed previously with plumbago.

This sample of metal may be plunged into water while it is red-hot, after which it may be broken under a hammer, and touched with a file. Should it break toughly, and should the file touch or abrade it freely, such is proof that the metal contains but .01 to .02 per cent. of carbon, and is in the required condition; but, on the contrary, should it break short or be bound too hard to yield freely to the file, it will be necessary to stir the bath under the influence of an oxidizing-flame, (by reducing the supply of gas,) or to reduce the proportion of carbon by addition of scrap-iron or scrap-steel of mild quality, or of oxidizing agents—such as rusty iron turnings or borings, iron ore, by preference, magnetic-iron sand containing titanic acid, nitrate of soda, litharge, or red lead, &c.—stirring the bath at the same time to expose all parts of the metal freely to the action of the reagents added until the proper condition may be obtained. This having been effected, from five to eight per cent. of ferro-manganese or spiegeleisen is to be charged in on the bridges of the furnace, through the side doors, and the furnace is to be worked with a slight excess of gas to prevent the oxidation of the spiegeleisen, and with an outward pressure at the doors; or the spiegeleisen may be melted in a separate furnace, either in crucibles or on an open bed, and charged into the principal furnace in a liquid state. The bath should be stirred gently as soon as the spiegeleisen is melted, after which, when the metal has ceased to boil violently, it may be considered as ready for being tapped.

The precise amount of spiegeleisen to be added will depend upon the proportion of carbon remaining already in the metal, and on the temper or the percentage of carbon required in the finished steel.

If the ore employed is very pure, no spiegeleisen may be required.

Samples may be taken out of the bath at intervals, and when the required temper has been reached the steel may be tapped at once into the ladle; but in most cases, when the ore is not exceptionally pure, and the steel obtained from it is contaminated with a sensible amount of sulphur, phosphorus, or other impurities, it will be found that ingots cast from the steel without the addition of spiegeleisen, ferro-manganese, or other reagents at the end of the process are red-short, and cannot be forged, and the greater the impurity of the steel the larger is the amount of spiegeleisen that will generally be required.

To admit of adding sufficient proportion of manganese in the form of spiegeleisen or ferro-manganese, in which form alone it is generally obtained, without at the same time introducing so much carbon as to make the steel too hard for many purposes, it is advisable in most cases to decarburet the metal almost entirely before the spiegeleisen is added; and this plan of reducing the proportion of carbon in the first instance to a definite point and adding a fixed percentage of spiegeleisen has the further advantage of facilitating very much the production of a uniform temper of steel.

By a little practice the point at which the metal is sufficiently decarbonized may be judged of very accurately by the appearance of the fracture of the sample taken out.

In the above-described process, before putting in the spiegeleisen I frequently throw into the bath a small proportion of oxide of lead, by preference litharge, which, in sinking to the bottom of the bath, by virtue of its superior specific gravity, is decomposed, the oxygen attaching the remaining carbon, as well as the silicon, while the metallic lead liberated combines with any sulphur that may be present, and thus powerfully contributes to prevent red-shortness of the steel produced.

I prefer to employ the litharge in fused pieces, or to form it (or any other oxide of lead) into blocks before use, by adding it, previously heated, to fused nitrate of soda, nitrate of potash, or other fused salt, (to which I sometimes add peroxide of manganese, either with or without other reagents,) as long as the litharge added continues to be thoroughly wet by the salt, and by casting or pressing the mass into suitable pieces. These solid blocks sink more readily in the metal, and if an oxidizing salt is used to cement the litharge together it will also aid in oxidizing the remaining carbon and silicon, and in improving the quality of the steel.

The amount of oxide of lead that should be added to the charge depends on the amount of impurity in the steel; but I find that from three to eight per cent. is the proportion generally required. Other salts, such as the tungstates and manganates of soda, or the metallic acids by themselves, may be used for producing similar effects.

When the litharge is thrown in to prevent the vapors thereof from getting into the regenerators, where they would in time tend to fuse the heated brick-work, I, by preference, shut off the communication to the chimney, and open a communication leading from the back of the furnace into the open air, or through a suitable connection, lined with fire-brick, into a condenser, communicating at its farther end with a chimney or other exhausting apparatus.

I construct the condenser, by preference, of a series of vertical or inclined iron tubes, through which water is made to circulate.

The litharge condensed upon the tubes may be removed from time to time, and used again for the same purpose.

The ladle T, (shown in section at Fig. 12,) which represents a modification of the steel-melting furnace, is mounted upon wheels, and lined in the usual manner, and heated internally by means of a gas-flame or a coke-fire. When the charge is ready for being tapped it may be moved in front of the furnace and below the tapping-hole S. The loose sand is next to be removed from the tapping-hole and put on one side until a portion of the hard crust in contact with the bath of metal is exposed. Thereupon the crust should be pierced (by a pointed iron bar) at the lowest point, and the metal will run into the ladle. The ladle should next be moved upon the rails to and over a casting-pit, provided with molds of a suitable form and size for the work required, each of which may be filled, one after the other, by raising the stopper V of the ladle by means of a lever.

The ingots thus obtained are to be hammered and rolled in the usual manner, or the metal may be cast direct into dry-clay molds of the form in which it is required for very strong castings. In this latter case the amount of carbon should be increased to one per cent. or more. The quality of steel so produced may be further modified by adding titanic acid, manganese, or various other substances to the ore.

When the furnace is emptied of its charge, and the bed of the furnace has been repaired, if necessary, by throwing in fresh sand, and the tapping-hole has been made up in the usual manner with sand or loam, the wires holding the disks should be cut, in order that they may be forced down (by the ore in the hoppers) on the bed of the furnace, and a fresh charge of ore be made to descend, as before. It is, however, not in every case necessary to introduce the disks at the end of every charge, in which case the action of the hopper will be strictly continuous.

The clay hoppers *i'* may be dispensed with by making the cast-iron hoppers *i* continuous, and supplying in themselves the cast-iron requisite to form the metallic absorbing-bath. This arrangement is shown at Figs. 14 and 15, Fig. 14 being a longitudinal section, and Fig. 15 a transverse section of the furnace, which, in this case, is provided with only one hopper.

I I are the cast-iron tubes or cylinders, connected together by means of bayonet-joints, as shown at the enlarged sections and plans at Figs. 16, 17, and 18, which tubes are filled with the ore, and are passed down the chambers F to the bed of the furnace D, where they are melted down with the ore, as described. As the tubes melt away and descend into the furnace fresh ones are to be attached at the top from the platform G. The upper part of the chamber F does not, in this case, communicate with a chimney, as in the previous arrangement, the ascending gases through the same escaping into the atmosphere around the descending hopper.

The other parts of the furnace and the mode of operating with the same are the same as described with reference to the previous arrangement, and need not be again referred to.

Figs. 4, 5, 11, 12, and 13 of the drawings show another modification of my improved furnace, or another mode in which I have contemplated the application of my improvement.

By this mode or furnace cast-steel may be prepared from a mixture of bar-iron or old rails of wrought-iron or steel, and pig metal alone.

Figure 5:
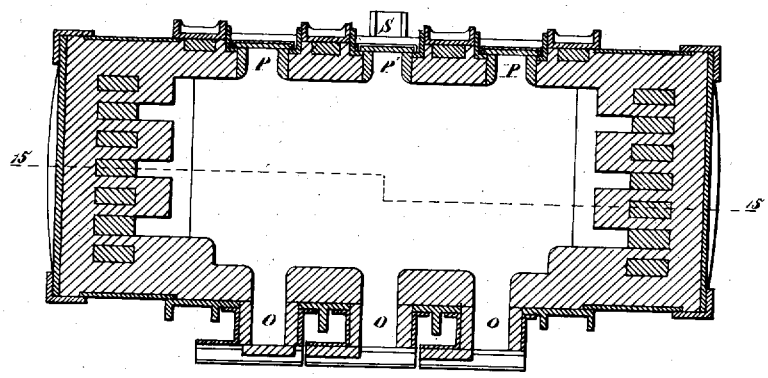
Figure 11:
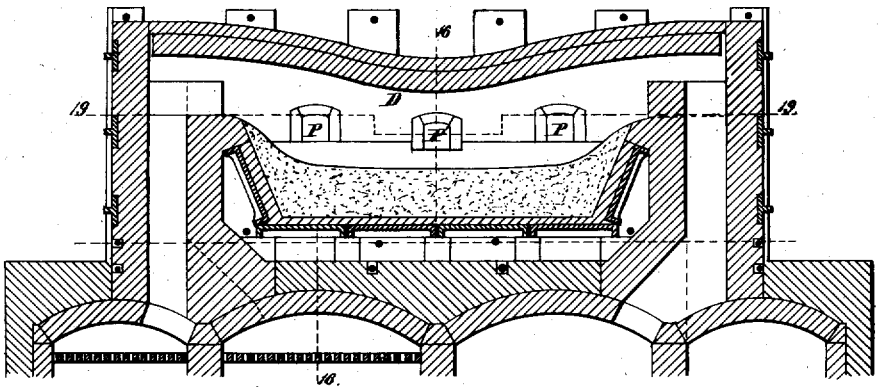
Figure 12:
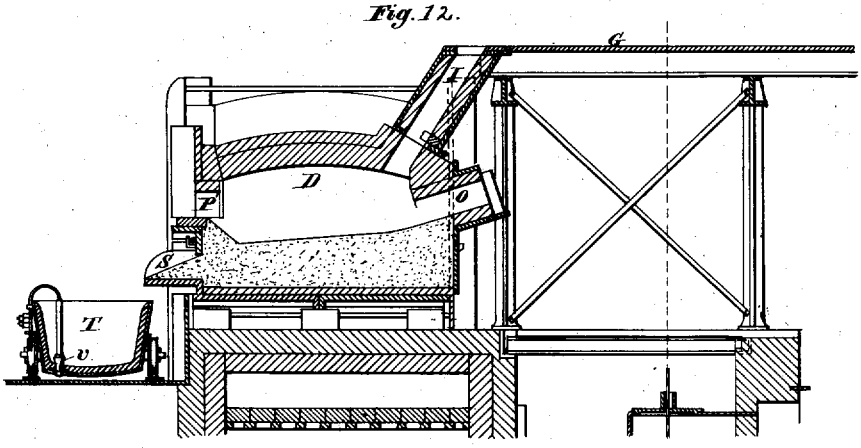
Figure 13:
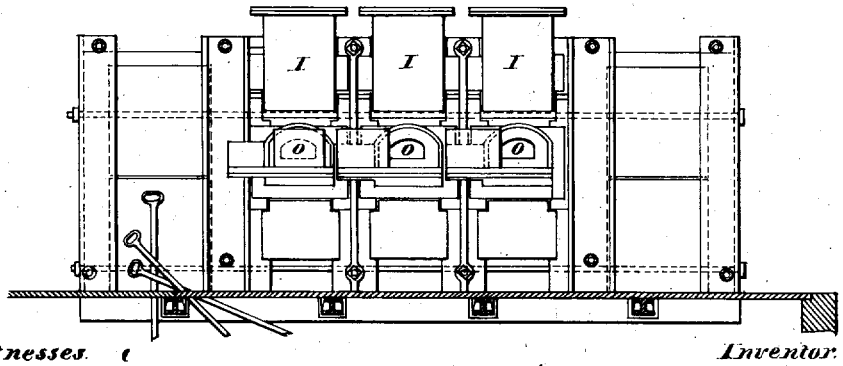

Fig. 11 denotes a longitudinal section of the furnace on line 15 15 of Fig. 5. Fig. 12 denotes a transverse section of the furnace on line 16 16 of Fig. 11. Fig. 13 represents a rear elevation, and Fig. 6 a front elevation, of it. Fig. 5 exhibits a sectional plan taken on line 19 19 of Fig. 11.

In this arrangement of form of my invention sloping hoppers I are substituted for the vertical hoppers in the previous arrangements. Down these sloping hoppers bar-iron or old rails may be slid from the platform G, so as to rest with their ends upon the bed of the furnace. Pig metal at the same time is to be introduced through the side openings O, so as, in melting, to form a bath, in which the bar iron or rails dissolve. As the latter are thus made gradually to slide down the hopper I a portion of the highly-heated products of combustion from the furnace is allowed to pass up the hoppers, escaping at the open ends thereof after having heated the wrought-iron to a red heat preparatory to its passing down into the bath.

If cast-iron alone is employed, while pig metal should be used, it is to be introduced into the furnace in a similar manner to the bar-iron—that is to say, down the hopper I. In this case the gas supplied to the furnace would be relatively diminished, and the chimney-draft increased, causing a current of intensely-heated oxygen to pass over the metal and to effect its decarburization. This effect may be increased by occasionally stirring the bath, and also by the introduction upon the surface of the bath of oxides of iron, by preference, of magnetic sands containing titanic acid, which latter will become absorbed and improve the quality of the steel produced.

A sufficient quantity of metal having accumulated in the bath, and the proper chemical condition of the bath having been ascertained by taking out a sample, and regulated as before described, from four to eight per cent. of spiegeleisen may be introduced through the side doors P or the hopper O, with or without the previous addition of a certain proportion of litharge or other oxidizing-salts, as before described, and the process of tapping may be carried out in a similar manner to that described with reference to the first arrangement.

Having thus described the nature of my invention, and the best means I am acquainted with of performing the same, I wish to be understood that what I claim is—

1. The process of treating the metal in the bath of the furnace, which consists in adding litharge or any other oxide of lead formed into cakes or compact masses before use, by mixing it, substantially as described, with fused nitrate of soda or nitrate of potash, as and for the purposes described.

2. The method of preventing injury to the furnace or the choking up of the regenerators or flues, when oxide or lead or other substances which give off gases or vapors are added to the molten metal in the bath of the furnace, which consists in drawing off the gases or vapors, or the greatest part of them, from the furnaces without letting them pass into the regenerators or flues, and then condensing them to recover the products.

3. The combination of one or more tubular hoppers, I I′, and the surrounding heating-chamber or chambers F, with the furnace D.

4. The combination of the tube J or J′ with each of said hoppers I I′.

5. The combination of the connection M, provided with holes and caps, as set forth, with tubes J J′, the said parts being arranged with the hoppers and furnace in the manner as set forth.

6. The combination of the system of heat-regenerators, as described, with the furnace D, its tubular hopper or hoppers, and the accessory heating chamber or chambers thereof, F F, the whole being made to operate together, and with one or more gas-producers, substantially as described.

7. In the process of making steel by a bath of metal and one or more hoppers and heating-chambers, as described, the method of managing the circulation and escape of the combustion products within a series of regenerators, whereby a portion of the products of combustion shall be withdrawn to heat the ore, metal, or material, while descending through the hopper or hoppers into the furnace or bath-chamber, and the remaining products of combustion, not reduced in temperature, be caused to pass through the regenerators to, and escape by, the chimney, the effect being to not reduce the temperature of the furnace by the introduction of the cool ore or materials through the hopper or hoppers.

In testimony that I claim the foregoing I have hereunto set my hand and seal this 26th day of June, 1876.

C. WILLIAM SIEMENS. [L. S.]

Witnesses:
CHAS. ROCHE,
G. D. DAVIES.